United States Patent
Kim et al.

(10) Patent No.: US 11,824,906 B2
(45) Date of Patent: Nov. 21, 2023

(54) NETWORK ARCHITECTURE FOR HYBRID CONFERENCING SERVICE

(71) Applicant: Between Inc., Toronto (CA)

(72) Inventors: David Kim, Toronto (CA); Brant Jameson, Sacramento, CA (US)

(73) Assignee: Socero Inc.

( * ) Notice: Subject to any disclaimer, the term of this patent is extended or adjusted under 35 U.S.C. 154(b) by 0 days.

(21) Appl. No.: 17/865,410

(22) Filed: Jul. 15, 2022

(65) Prior Publication Data

US 2023/0025405 A1    Jan. 26, 2023

Related U.S. Application Data

(60) Provisional application No. 63/222,312, filed on Jul. 15, 2021.

(51) Int. Cl.
*H04L 65/403* (2022.01)

(52) U.S. Cl.
CPC .................. *H04L 65/403* (2013.01)

(58) Field of Classification Search
CPC ..................................................... H04L 65/403
USPC ......................................................... 709/204
See application file for complete search history.

(56) References Cited

U.S. PATENT DOCUMENTS

| | | | | |
|---|---|---|---|---|
| 7,084,898 B1* | 8/2006 | Firestone | ............... | H04N 7/152 348/14.09 |
| 8,982,173 B1* | 3/2015 | Swanson | ............... | H04N 7/152 709/204 |
| 2010/0057881 A1* | 3/2010 | Corry | .................... | G06F 3/0665 709/216 |
| 2013/0151621 A1* | 6/2013 | Karniely | ............... | H04M 3/567 709/204 |
| 2015/0016283 A1* | 1/2015 | Lyle | .................... | H04L 65/1083 370/252 |
| 2016/0021499 A1* | 1/2016 | Viswanadham | ......... | H04W 4/02 455/41.2 |
| 2016/0323389 A1* | 11/2016 | Miller | ........................ | H04L 9/40 |
| 2017/0053640 A1* | 2/2017 | Kwan | ............... | G10K 11/17885 |

* cited by examiner

*Primary Examiner* — Zi Ye
(74) *Attorney, Agent, or Firm* — Soquel Group I.P Ltd.

(57) ABSTRACT

A hybrid multimedia conference service, including a remote service for conferencing, running in the cloud and connecting remote clients, and distributing multimedia to and from the remote clients during a conference, and a local service for conferencing, distributing multimedia to and from local devices during the conference, wherein a local device that hosts the local service may change over time as local devices in a room join and exit the conference, by a current local device host transferring its state to another local device, the local service including a multimedia distributor transmitting and receiving multimedia between the remote service and the local service, and a playback synchronizer switching between captured multimedia streams and synchronizing captured multimedia for transmission to the remote service via said multimedia transmitter.

13 Claims, 4 Drawing Sheets

NETWORK ARCHITECTURE FOR HYBRID CONFERENCING SERVICE

PRIORITY REFERENCE TO PROVISIONAL APPLICATION

This application claims benefit of and hereby incorporates by reference U.S. Provisional Application No. 63/222,312, entitled METHOD AND PROCESS FOR OPERATING A HYBRID VIDEO MEETING SERVICE, and filed on Jul. 15, 2021 by inventors David Kim and Brant Jameson.

FIELD OF THE INVENTION

The present invention relates to multimedia conferences.

BACKGROUND OF THE INVENTION

Current conferencing services such as Zoom, Teams, Skype, Webex, etc. connect all participants to the same conversation or presentation. Alternatively, breakout rooms have been designed to allow users to organize themselves into separate conferences to continue independent conversations.

SUMMARY

A "hybrid video meeting" herein is defined as a meeting with participants within physical proximity of each other inside a meeting room and simultaneously having participants outside of the meeting room, participating through a video conferencing service. The complex audio processing and network latency challenges of conducting a hybrid video meeting have prevented entry into the market from existing conferencing services.

The present invention is a new method and process for a video conferencing service which maintains multiple people having separate conversations in a hybrid video meeting and provides a seamless transition to/from these conversations through a combination of user controls and automatic detection and separation of conversations.

A video meeting service of heterogeneous devices connected to a hybrid video meeting service which includes at least two distinct software processes: one running in the cloud and another on the local area network. Users remain connected to each other and are provided with the means to participate in all the conversations occurring in the virtual meeting space. Multiple local area network processes may connect to the cloud, and each other, by way of the cloud service. Synchronization of multimedia streams for local devices simulates a high-quality video conference system from a disparate set of devices.

There is thus provided in accordance with an embodiment of the present invention a hybrid multimedia conference service, including a remote service for conferencing, running in the cloud and connecting remote clients, and distributing multimedia to and from the remote clients during a conference, and a local service for conferencing, including a distributed process hosted by a local device in a room, which communicates with other local devices in the room over a local area network (LAN), and which distributes multimedia to and from local devices during the conference, wherein the local device that hosts the local service may change over time as local devices in the room join and exit the conference, by a current local device host transferring its state to another local device, the local service including a multimedia distributor transmitting and receiving multimedia between the remote service and the local service, a conference participant ranker, an active user selector communicating with the conference participant ranker, switching between captured multimedia streams, and a playback synchronizer communicating with the active user selector, synchronizing captured multimedia for transmission to the remote service via the multimedia transmitter.

There is additionally provided in accordance with an embodiment of the present invention, a method for hybrid multimedia conferencing, including distributing, via a remote service running in the cloud, multimedia to and from remote clients. distributing, via a local service installed on at least one local device in a room, which connects other local devices in the room on a local area network (LAN), multimedia to and from the local devices, transmitting and receiving multimedia between the remote service and the local service, ranking, by the local service, conference participants, switching, by the local service, between captured multimedia streams. and synchronizing, by the local service, multimedia received by the local devices, for transmission to the remote service.

These is furthermore provided in accordance with an embodiment of the present invention, a method for identifying simultaneous conversations using a local service running on a device connected to at least one other device through a local area network (LAN), the devices joined to a conference, including analyzing, by each device, a local video stream of a user interacting with the device, to identify at least one or more facial expressions of the user, the users lip movements, and the user's direction of gaze, comprising classifying, by a classification system running on a cloud service, each frame of each local video stream, reporting distance and angle between devices to a LAN service, creating, by the LAN service, a virtual map of the physical space in which the devices reside, identifying a number of distinct conversations occurring in the space, selecting, by the LAN service, the best audio and video device or devices for each distinct conversation, and attenuating volumes of distinct conversations based on positions of users in the virtual map, using audio enhancement algorithms.

Yet further, creating is based on inputs received from devices in the room, and from surrounding room acoustics.

Moreover, the audio enhancement algorithms comprise one or more of (i) beam forming and (ii) blind source separation.

Additionally, the creating uses head-related transfer functions (HTRF) for users wearing HTRF-enabled earphones.

Furthermore, the attenuating comprises applying distance/azimuth transformations to add conversation-based noise isolation.

Yet furthermore, the attenuating comprises encoding audio using speech waveform differentiation and real-time conversation segmentation.

BRIEF DESCRIPTION OF THE DRAWINGS

The present invention will be more fully understood and appreciated from the following detailed description, taken in conjunction with the drawings in which.

Figure 1:
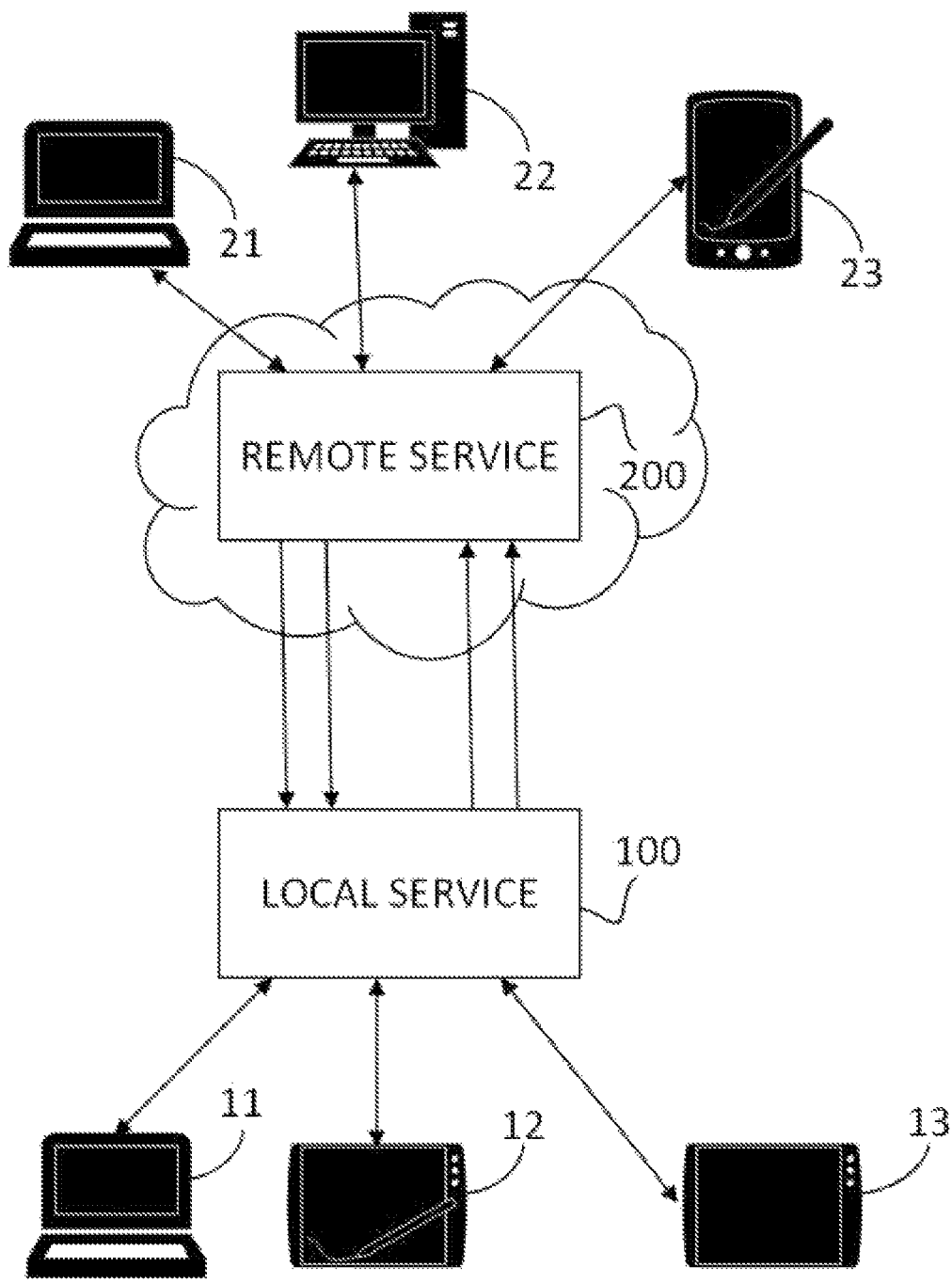
FIG. 1 is a simplified drawing of a hybrid video mixing service showing how multimedia flows to and from a remote and a local service from different devices connecting to the services, in accordance with an embodiment of the present invention.

The following definitions are employed throughout the specification.

HYBRID CONFERENCE—a meeting with participants within physical proximity of each other inside a meeting room, and simultaneously having participants outside of the meeting room, participating through a video conference service.

IVR—interactive video response is a common term for the user interface connecting users to a video/voice conference. Conference details and PINs are often provided by URL or user input to connect users to a particular call.

LOCAL DEVICES/REMOTE CLIENTS—consumer electronic devices that support video conferencing; i.e., audio/video capture and playback, and run a video conferencing application. Examples of local devices include inter alia mobile phones, tablets and laptops.

LOCAL SERVICE—a distributed software process that runs on one of the devices on the local area network (LAN). Other devices on the LAN connect to this process and send/receive multimedia data and receive commands from the process.

REMOTE SERVICE—a software process that runs in the cloud. Remote devices connect directly to this service and send/receive multimedia to/from the remote service. Any number of local services may connect to the remote service, thus connecting several local devices.

For reference to the figures, the following index of elements and their numerals is provided. Similarly numbered elements represent elements of the same type, but they need not be identical elements.

| Table of elements in the FIGS. | |
|---|---|
| Element | Description |
| 11, 12, 13 | local devices |
| 21, 22, 23 | remote clients |
| 100 | local service |
| 110 | multimedia distributor |
| 120 | conference participant ranker |
| 130 | active user selector |
| 140 | playback synchronizer |
| 200 | remote service |

Elements numbered in the 1000's are operations of flow charts.

DETAILED DESCRIPTION

Embodiments of the present invention include hybrid video meeting services and methods of their operation. Embodiments of the present invention include a distributed system that runs on a common consumer electronics device; e.g., cell phone, laptop or tablet. The system's state may be transferred from one device to another as required to maintain the continuity of the meeting's multimedia stream(s).

In an embodiment of the present invention, heterogeneous devices connect to a hybrid video meeting service which consists of at least two distinct software processes: one running in the cloud and another on the local area network. The cloud based service, or remote meeting hybrid mixer service interfaces to the local meeting hybrid mixer service(s).

In accordance with embodiments of the present invention, a method for operating a hybrid video conference includes:
1. one or more local meeting hybrid mixer services installed on at least one local device;
2. other devices in the room connected through the local meeting hybrid mixer service(s); and
3. the local meeting hybrid mixer service(s) connect with a remote meeting hybrid mixer service.

Reference is made to FIG. 1, which is a simplified drawing of a hybrid video mixing service showing how multimedia flows to and from a remote meeting hybrid mixer service 200 and one or more local meeting hybrid mixing service(s) 100 from different devices connecting to the services, in accordance with an embodiment of the present invention. FIG. 1 shows local devices 11, 12 and 13, and remote clients 21, 22 and 23.

Local service(s) 100 in FIG. 1, are distributed processes which run on any local area network (LAN) client, or registered device connected to the local network, allowing their states to be transferred from one device to another at any time to ensure their reliability. Local service(s) 100 connect directly to remote service 200, enabling the distribution of local service(s) 100 client multimedia to remote clients 21, 22 and 23, and remote service 200 client multimedia to local devices 11, 12 and 13.

Local service 100 is a distributed software process which runs on one of local devices 11, 12 and 13 on a LAN. Other devices on the LAN connect to this process and send/receive multimedia data and receive commands from the process.

Remote service 200 is a software process which runs in the cloud and is similar to a traditional video conferencing multipoint control unit (MCU). Any number of remote clients 21, 22 and 23 connect directly to remote service 200 and send/receive multimedia data from it. Any number of local service 100 processes may also connect to remote service 200, connecting several client devices.

Remote service 200 employs industry standard resilience techniques for detecting and recovering from crashes and network outages. In addition to these techniques, data caching of local service(s) 100 state parameters is employed to ensure proper connectivity is maintained during remote service restarts and spawns. Caching of data as required to reconnect remote clients 21, 22 and 23, local devices 11, 12 and 13, and local service 100 to the call, is handled by logging state information to disk with a resilience monitoring process detecting crashes, outages and respawning services as required with previously cached data.

Local devices 11, 12 and 13, and remote client clients 21, 22 and 23 are commonly available consumer electronic devices that support video conferencing; i.e., audio/video capture and playback, and run a video conferencing application. Examples include mobile phones, tables tablets and laptops.

FIG. 1 shows how media flows to/from remote service 200 and local service(s) 100 from different clients/devices connecting to these services.

Each local service 100 runs on a local device, which may change over time as devices join and exit the call.

Each local service 100 and remote service 200 maintain state information of devices connected to the local service, which are periodically updated at an interval negotiated by both services. In other words, each service, both local and remote, knows when to expect updated state information. Each local device is connected to remote service 200 and updates its state information periodically in a signal that is designated herein as the "device/remote service heartbeat". This signal is independent of the media signals, including audio, video and subtitles. Each local device updates its state information with the local service 100 that it is connected to with what is designated herein as the "device/local service heartbeat". Local service 100 updates its version of the device state information with remote service 200 with what is designated as the "services heartbeat". This state information for each device may include without limitation the following parameters:

network address;
CPU speed;
CPU type;
CPU usage;
available RAM;
estimates of Wi-Fi signal strength;
estimates of the network bandwidth;
network packet loss; and
network jitter.

Using acquired state information, both remote service 200 and local service 100 rank the connected devices to determine which local device would be the optimal host for local service 100. Should a more optimal host device exist, either local service 100 or remote service 200 may initiate a local service state transfer, or spawn a new local service 100 with some subset of devices and accompanying state information.

Local service(s) 100 and remote service 200 may detect any of the following events that result in a loss of connectivity or operations for local service 100, which are herein referred to as "local service resilience events":

local service host requests to exit meeting;
loss of connectivity between local and remote services;
local service crash; and
unexpected disconnect of local device(s) from local service.

There may be multiple causes for each resilience event, but each may be monitored by observing the following signals:

user end of call request for the local service device host;
optimal host transfer signal;
services heartbeat;
device/local service heartbeat; and
device/remote service heartbeat.

Monitoring of the aforementioned signals may include filtering in time, to allow for intermittent loss of some state sample(s) in the signal. This filtering is then used to determine whether a heartbeat signal is "healthy" or "unhealthy", which precipitates further action(s) based on the outcome.

Local service(s) 100 may detect the "user end of call request for the local service device host" signal by shared memory or by network signal from the local device to local service 100. In this event, local service 100 signals the next optimal host device over the LAN, sending the previously mentioned "local service transfer signal" to indicate that the transfer will begin. Once a local service transfer signal is acknowledged, local service 100 transfers the current local service state to the target device, and the target device signals remote service 200 that the transfer has begun. Once the local service state is transferred, the originating device signals all local devices still connected to local service 100 to transfer their connections to the new local service host. The originating device may exit the conference call, and the new host device begins execution of local service 100 and informs remote service 200 that the transfer has completed.

If a local service 100 or remote service 200 decide that a specific local device is a most optimal host for local service 100, either service may initiate a transfer of the local host service. The process is essentially the same in either case. The only difference between the two cases is if remote service 200 initiates the transfer, it necessarily signals local service 100 to begin the process. If local service 100 acknowledges the request, then the transfer occurs in the same manner that follows, which is identical to the case where local service 100 initiates the transfer. Local service 100 signals the next optimal host device over the LAN, sending the previously mentioned "local service transfer signal" to indicate that the transfer will begin. Once a local service transfer signal is acknowledged, local service 100 transfers the current local service state to the target device, and the target device signals remote service 200 that the transfer has begun. Once the local service state is transferred, the originating device signals all local devices still connected to local service 100 to transfer their connections to the new local service host. The new host device begins execution of local service 100 and informs remote service 200 that the transfer has completed.

In the event that local service 100 loses connectivity to remote service 200, if the aforementioned "services heartbeat" signal is no longer considered "healthy", remote service 200 selects a next most optimal local device as the new local service host. Remote service 200 initiates a local service transfer by sending the aforementioned "local service transfer signal" to all of the local devices previously connected to the local service in question. The new local host device may accept this role by acknowledging the signal with remote service 200. Once acknowledged, the new local host begins functioning as the local service host. Each local device then acknowledges the transfer with the new local host, which then updates its list of local devices. If some previously connected local device(s) cannot be reached, a signal is sent to remote service 200 with a list of unreachable devices. These devices are dropped from the call and forced to reconnect through the conference interactive video response (IVR). If no local host can be found for the call, all local devices previously connected to local service 100 are dropped from the call and forced to rejoin through the conference IVR.

If local service 100 detects a "device/local service heartbeat" signal as being "unhealthy", then local service 100 signals remote service 200 about the device's state. Remote service 200 then attempts to signal the local device and probe its connectivity. If the device is still reachable, remote service 200 transfers the local device to remote service 200 for continued conference connectivity. If the device is unreachable by remote service 200, the device is dropped from the conference and forced to rejoin the call through the conference IVR.

For remote service 200, if the "device/remote service heartbeat" signal is detected as being "unhealthy", then remote service 200 signals local service 100 to request an update of the device's status. If local service 100 receives a response from the device in question, local service 100 informs remote service 200 that the device is still reachable. The local device remains connected to the call, but is removed from the list of available local host devices until the "device/remote service heartbeat" is re-established. Once the "device/remote service heartbeat" is re-established, the local device is added back to the list of available local service hosts, with an appropriate ranking. If the local device cannot be reached by local service 100, it is dropped from the call and that device is forced to rejoin the conference through the conference IVR.

Figure 2:
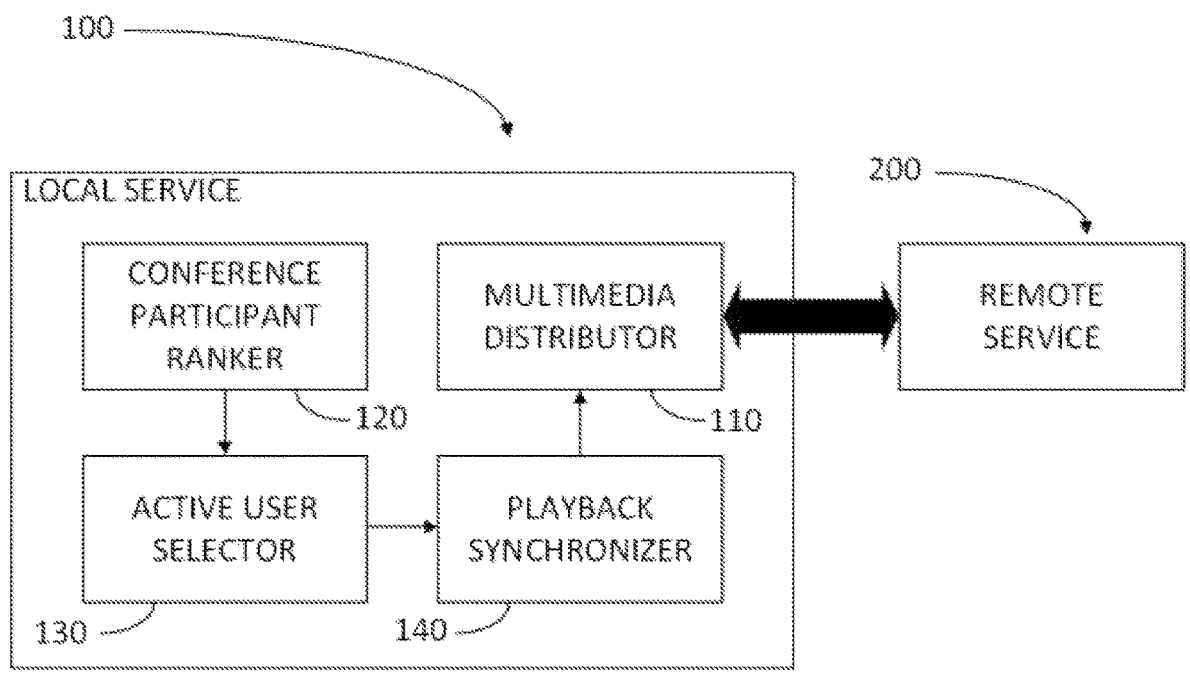
FIG. 2 is simplified block drawing of a local service for conferencing, in accordance with an embodiment of the present invention.

Reference is made to FIG. 2, which is simplified block drawing of a local service 100, in accordance with an embodiment of the present invention. FIG. 2 shows four primary components of local service 100; namely, multimedia distributor 110, conference participant ranker 120, active user selector 130 and playback synchronizer 140.

For remote service 200 and local service(s) 100, multimedia is routed, composited and mixed in a way that reduces network bandwidth and helps reduce/eliminate audio feedback and echo. Remote service 200 functions as a conventional conference MCU. Local service 100 differs from a typical conference MCU, in the manner that it handles multimedia streams from local devices. To avoid feedback and reduce echo in the local devices, local service 100 implements specialized mixing/routing of multimedia. Local device multimedia is mixed/routed/composited before being sent to remote service 200 by multimedia distributor 110. Local devices do not receive other local devices' multimedia streams, which differs considerably from how a traditional MCU processes data.

Conference participant ranker 120 processes multimedia streams received from each local device and performs conference participant ranking. This ranking may be used by active user selector 130 to select a microphone/camera stream to be transmitted to remote service 200. Playback synchronizer 140 mixes multiple microphone/camera streams in a variety of ways to improve the user experience. This may include, without limitation:
compositing video;
microphone selection;
adjusting gain control;
beam forming; and
blind source separation.

Multimedia distributor 110 receives multimedia streams, including audio, video and subtitles, from remote service 200 and playback synchronizer 140 performs time synchronization of these streams across local devices connected to it, correcting for clock skew to ensure echo cancellation functions well and that video playback occurs at the same time for each local device.

Playback synchronizer 140 prioritizes multimedia streams, using bandwidth management algorithms. These algorithms adjust the video resolution/bandwidth/framerate as well as the audio codec parameters, including sampling rate and bitrate, to optimize quality of experience.

Playback synchronizer 140 quickly reacts to changing network conditions by requesting changes in video resolution and adding/removing audio streams from the mix as required to meet Quality of Service (QoS) objectives.

The network architecture of FIG. 1 enables tight time synchronization of multimedia streams for devices 11, 12 and 13, as required to simulate a high-quality video conference system from a disparate set of devices, and reduces the required network bandwidth from the LAN to the world wide web, via connections between local service(s) 100 and remote service 200, thus improving the quality of experience and reducing remote service 200 network and computational overhead.

Each local service 100 distinguishes between separate conversations that are occurring on devices connecting to it, allowing the hybrid meeting service to separate and merge conversations automatically.

A local device 11, 12 or 13 joins a conference with a unique ID via an installed application or URL, which then launches a conferencing application. The device connects to cloud-based remote service 200 which infers whether the device is a remote client or a local device by user selection. In the case of a local device, the application identifies other local devices on the LAN, using a protocol such as BLUETOOTH®, audio, video and Wi-Fi data to determine whether another device on the LAN has joined the same meeting. If other devices on the LAN are identified, they are queried by the application to determine the state of local service 100. If local service 100 does not exist, then local service 100 is instantiated on the device. Once the presence of local service 100 is established, the application connects local service 100, allowing the application to begin playing and capturing media to be used for the conference.

Devices may join and exit a meeting at the user's discretion, or in the event of a network outage or a device/process crash. The state of local service 100 is transferable from one device to another, to maintain a robust connection to the meeting. As each device connects to local service 100, its capabilities are queried and stored in the application. As local devices connecting to local service 100 may have different capabilities, local service 100's optimal host may vary from one set of devices to another. If the device is ascertained to be a more appropriate device to operate local service 100 on, local service 100 analyzes the audio/video streams and waits for a period of relative inactivity to occur, at which point it transfers its state from its previous host to the new host to minimize multimedia disruptions.

Several mechanisms are used to determine if a device is still available to connect to and run local service 100: the multimedia streams' flow—similar to a heartbeat, a "broadcast upon crash" signal, and a "leaving the meeting signal" may be transmitted over the LAN to all local devices enabling local service 100 state transfer. In the event that a crash is detected, the application chooses a next best device from the list and re-instantiates local service 100 immediately. If multimedia streams over the LAN are continuously interrupted, local service 100 transfers to a new host. When a device signals that it is leaving the meeting, local service 100 immediately transfers its state.

Several multimedia streams can be negotiated in both directions by local service 100. These streams correspond to separate conversations occurring in the hybrid meeting space and/or media streams deemed of interest to users by local service 100. Multimedia streams received from remote service 200 by local service 100 may be mixed and/or routed to appropriate devices in the local meeting. Local endpoints communicate with local service 100 to synchronize playback. Local devices 11, 12 and 13 send their media streams to local service 100. Local service 100 synchronizes these capture streams and may perform additional processing before transmitting the streams to remote service 200.

Figure 3:
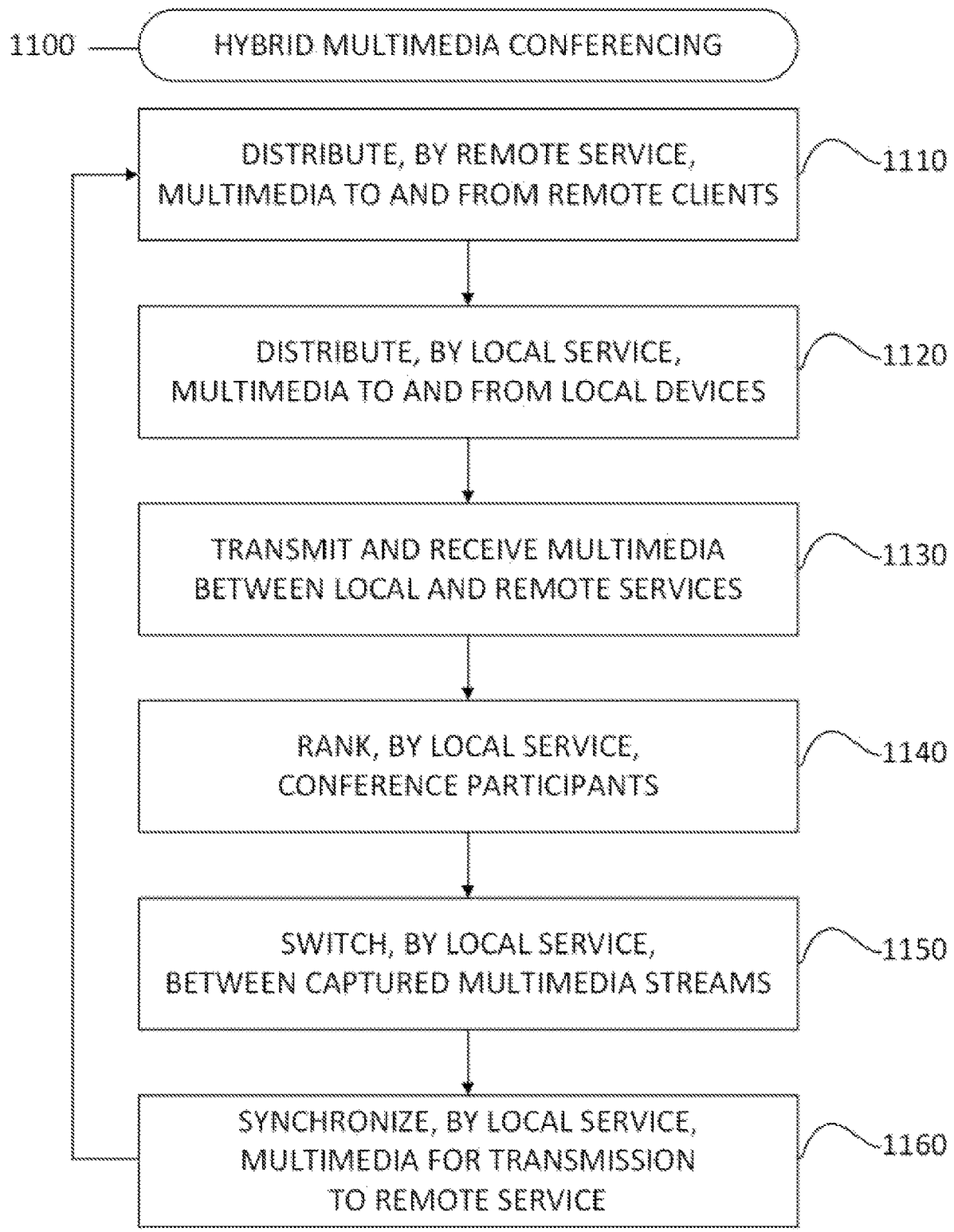
FIG. 3 is a simplified flowchart of a method for hybrid conferencing, in accordance with an embodiment of the present invention.

Reference is made to FIG. 3, which is a simplified flowchart of a method 1100 for hybrid conferencing, in accordance with an embodiment of the present invention. At operation 1110 remote service 200 distributes multimedia data to and from remote clients 21, 22 and 23. At operation 1120 local service(s) 100 distribute multimedia data to and from local devices 11, 12 and 13. At operation 1130 multimedia data is transmitted and received between local service(s) 100 and remote service 200. At operation 1150 local service(s) 100 switch between captured multimedia streams. At operation 1160 local service(s) 100 synchronize multimedia data for transmission to remote service 200.

Figure 4:
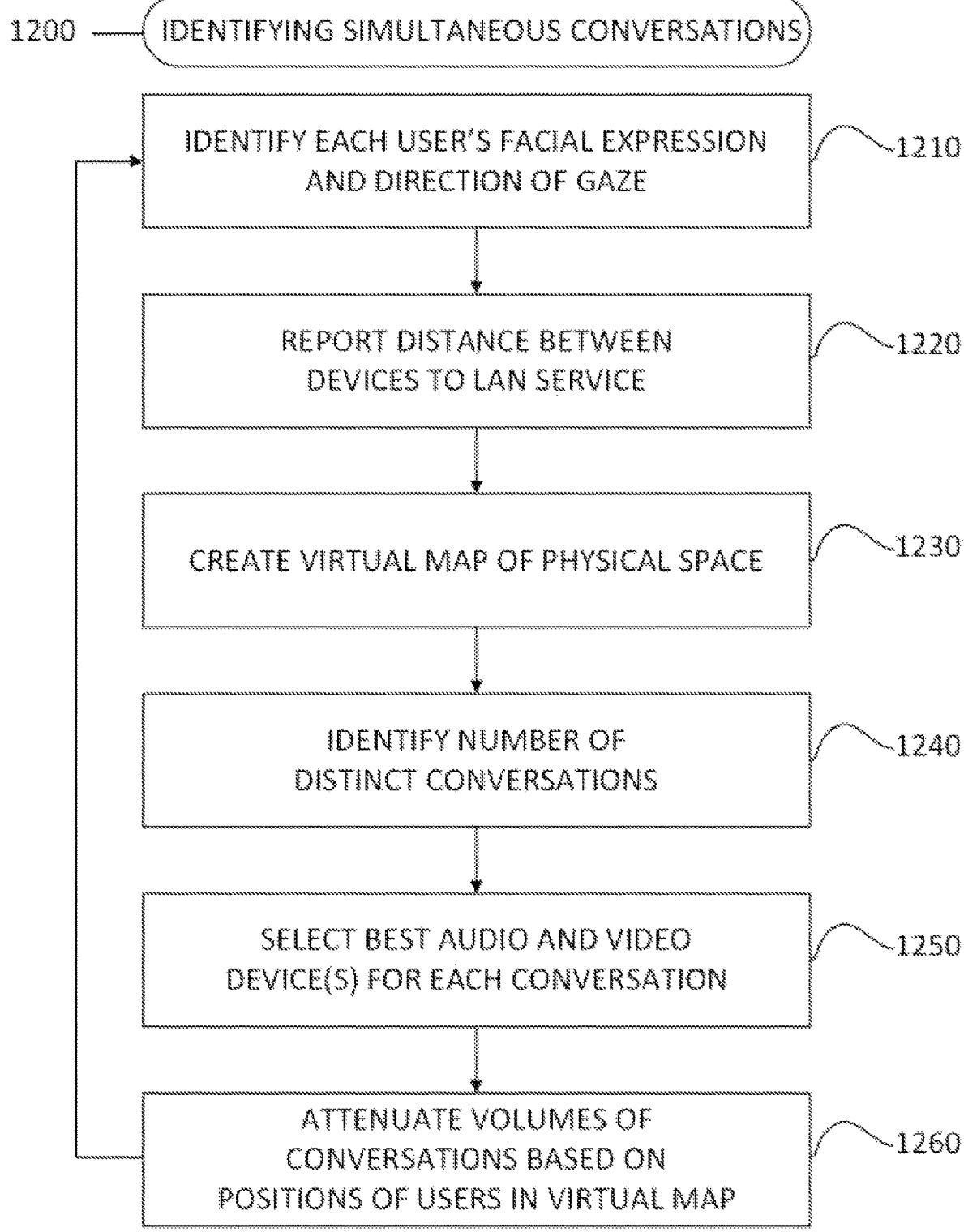
FIG. 4 is a simplified flowchart of a method for identifying multiple conversations taking place in a room, in accordance with an embodiment of the present invention.

Reference is made to FIG. 4, which is a simplified flowchart of a method 1200 for identifying multiple conversations taking place in a room, in accordance with an embodiment of the present invention. At operation 1210 local service 100 identifies each ser's facial expression and direction of gaze. At operation 1220 local service 100 reports distance between devices to a LAN service. At operation 1230 the LAN service creates a virtual map of the room. At operation 1240 the LAN service identifies a number of distinct conversations. At operation 1250 the LAN service selects the best audio and video devices for each conversation. At operation 1260 the LAN service attenuates volumes of conversations based on positions of users in the virtual map of the room.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A hybrid multimedia conference service, comprising:
    a remote computer server comprising at least one memory storing program code with instructions that cause the remote computer server to run a remote service for conferencing, the remote service running in the cloud and connecting remote clients, and distributing multimedia to and from the remote clients during a conference; and
    a local computer server comprising at least one memory storing program code with instructions that cause the local computer server to run a local service for conferencing, the local service comprising:
        a distributed process hosted by a local device in a room, which directly communicates with other local devices in the room over a local area network (LAN), each local device having a state, and which dynamically distributes multimedia to and from local devices during the conference, wherein the local device that hosts the local service changes dynamically during the course of the conference based on the state of each local device as local devices in the room join and exit the conference, by a current local device hosting the local service transferring its state to another local device, in order to maintain continuity and minimize disruption in the conference, the local service comprising:
            a multimedia distributor transmitting and receiving multimedia between the remote service and the local service, dynamically managing the distribution of multimedia streams; and
            a playback synchronizer switching between captured multimedia streams and synchronizing the captured multimedia for transmission to the remote service via said multimedia transmitter ensuring seamless and synchronized playback across all devices.

2. The hybrid multimedia conferencing service of claim 1 wherein a local device on the LAN that joins the service is assigned a unique ID via an installed application or URL that runs the local service on the local device, and initializes a protocol to determine other devices on the LAN that join the service.

3. The hybrid multimedia conferencing service of claim 1, where the local service transfers its state from a current local device host to a more optimal local device host, when the more optimal device host is discovered, the local service adapting itself to the capabilities of the more optimal device.

4. The hybrid multimedia conferencing service of claim 1 wherein said playback synchronizer adapts to changes in playback latency, compensates for clock skew, and prevents skew from disrupting acoustic echo cancellation.

5. The hybrid multimedia conferencing service of claim 1 wherein said local service reacts to changing network conditions by requesting changes in video resolution, and adding and removing audio streams, to meet Quality of Service (QoS) requirements.

6. The hybrid multimedia conferencing service of claim 1 wherein the conference comprises class lectures, robotics with video conferencing or telepresence functionalities, mixed or augmented reality applications or hardware.

7. A method for hybrid multimedia conferencing, comprising:
    distributing, via a remote service running in the cloud, multimedia to and from remote clients;
    distributing, via a local service installed on at least one local device in a room that hosts the local service, which connects other local devices in the room on a local area network (LAN), multimedia to and from the local devices, each local device having a state;
    identifying, by the local service, another local device that is more optimal to be a host of the local service than the current local device host based on the state of each local device;
    automatically causing, by the local service, the current local device host to transfer its state to the other local device;
    transmitting and receiving multimedia between the remote service and the local service;
    dynamically managing the distribution of multimedia streams, comprising actively switching, by the local service, between captured multimedia streams; and
    synchronizing, by the local service, multimedia received by the local devices, for transmission to the remote service, ensuring seamless and synchronized playback across all device.

8. The method of claim 7, further comprising microphone zoning, which transmits a real time echo/background noise-suppressed audio feed to remote clients.

9. The method of claim 7, further comprising:
    assigning, by the local service, a unique ID to a local device on the LAN that joins the conference; and
    initializing, by the local service, a protocol to determine other devices on the LAN that may join the conference, the protocol using one or more of Bluetooth, audio, video and Wi-Fi data.

10. The method of claim 7, further comprising:
    determining, by the local service, that the current local device host has disconnected from the conference or ceased functioning;
    automatically transferring, by the local service, a local service process state to another local device;
    notifying, by the local service, other local devices in the conference, of said automatically transferring; and
    initiating, by the other local device, a new connection to the remote service.

11. The method of claim 7 further comprising implementing, by the local service, a network time sync using one or more of (i) a network time protocol (NTP), (ii) ultrasonic time synchronization, and (iii) analysis of acoustic echo canceller (AEC) state variables.

12. The method of claim 7 further comprising prioritizing, by the local service, multimedia streams, using bandwidth management algorithms.

13. The method of claim 7 further comprising enabling the local devices and the remote clients to transfer to and from distinct conversations via user controls.

\* \* \* \* \*